May 4, 1965  J. MILLER  3,181,684
TRANSFER MECHANISM FOR CONVEYOR KEG PALLETIZING DEVICE
Filed June 16, 1961 2 Sheets-Sheet 1
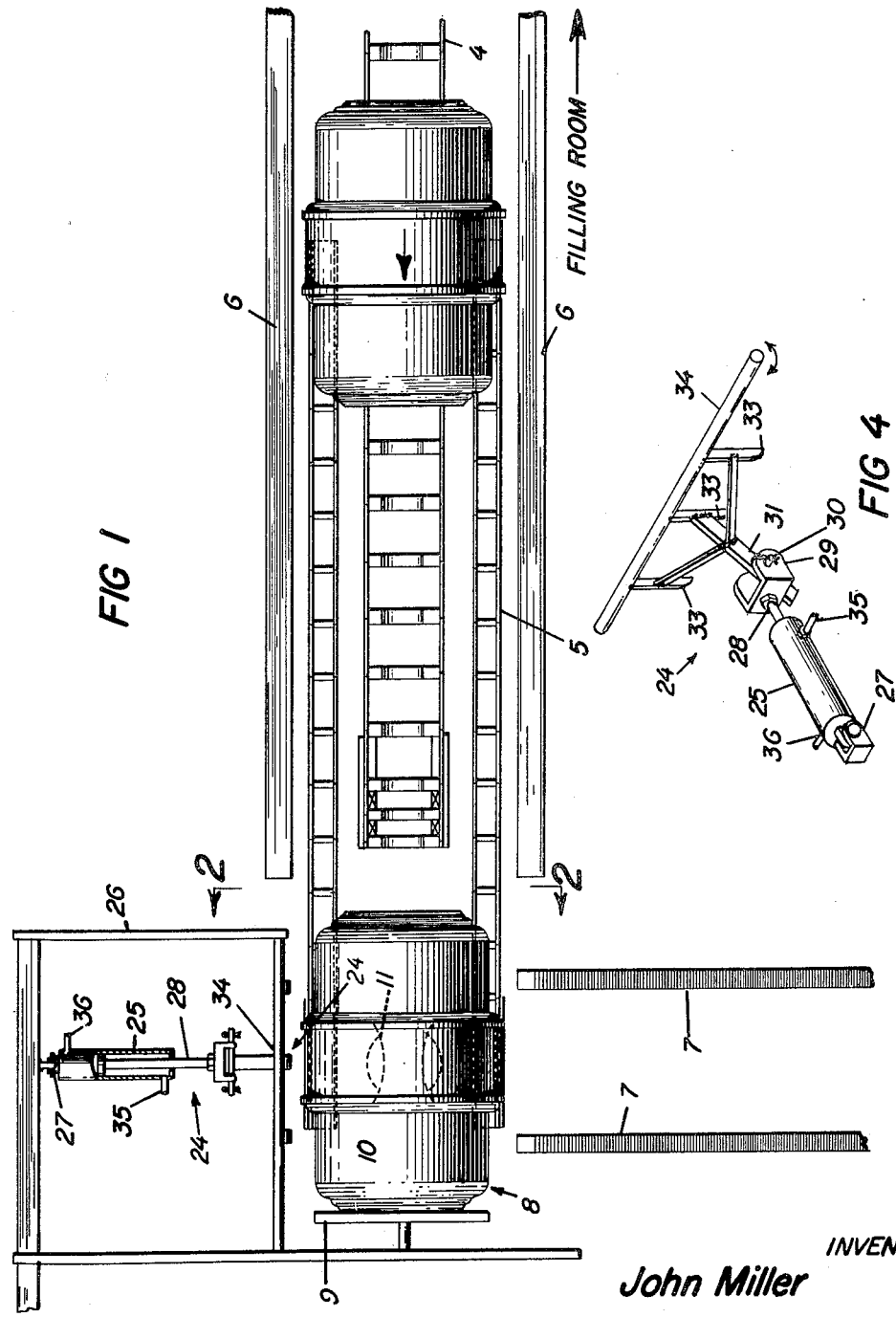
INVENTOR
John Miller
by Wenderoth, Lind & Ponack
ATTORNEYS

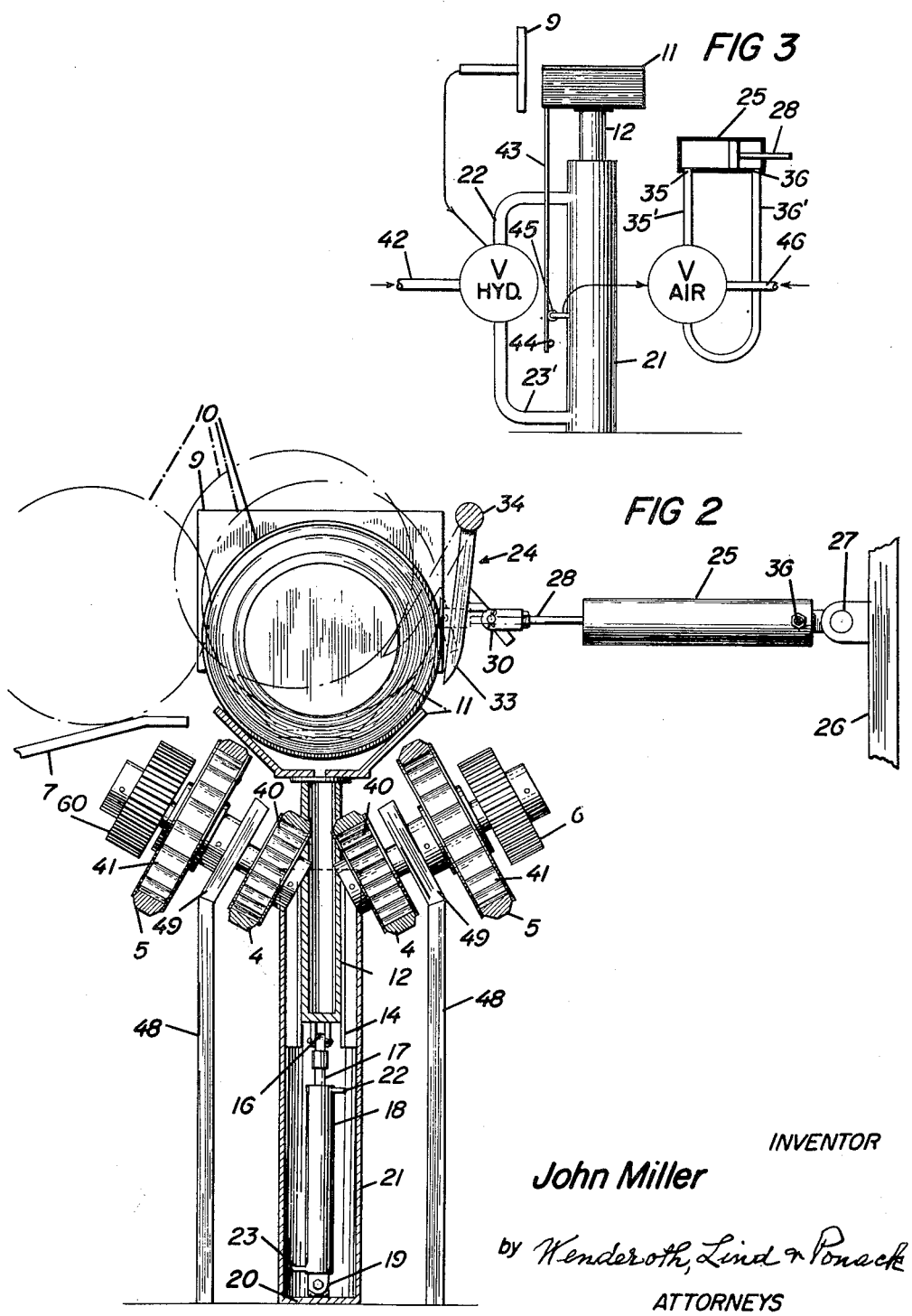

United States Patent Office 3,181,684
Patented May 4, 1965

3,181,684
TRANSFER MECHANISM FOR CONVEYOR KEG PALLETIZING DEVICE
John Miller, Cambria Heights, N.Y., assignor to The F. & M. Schaefer Brewing Company, Brooklyn, N.Y.
Filed June 16, 1961, Ser. No. 117,720
5 Claims. (Cl. 198—24)

This invention relates to an automatic keg palletizing machine particularly adapted for stacking barrels or kegs into unit loads which are thereafter conveyed to a storage area or to a transportation station for the delivery of the barrels or kegs to a user. It has particular reference to the transfer mechanism for such a machine.

The present invention is an improvement upon the transfer mechanism shown and described in Patent No. 3,022,617 granted February 27, 1962, entitled "Conveyor Keg Palletizing Device" by John Miller and Vincent J. Russoman.

An object of the invention is to provide a more efficient transfer mechanism for the barrels or kegs and particularly such a transfer mechanism which is more reliable and sure in operation in transferring the barrels or kegs from the conveyor to the skids which convey such barrels or kegs to the palletizing position.

With the above and other objects in view which will become apparent from the detailed description below the improved transfer mechanism is shown in the drawings in which:

FIGURE 1 is a plan view of one of the transfer mechanisms used in the conveyor keg palletizing device.

FIGURE 2 is a sectional view taken upon section line 2—2 of FIGURE 1 looking in the direction of the arrows.

FIGURE 3 is a diagrammatic view illustrating the controls for the conveyor mechanism, and FIGURE 4 is a perspective view of the kick-off fingers.

In FIGURE 1 one of the conveyors bringing the kegs from the filling room is shown at 4 while the pick-up conveyor chain which brings the keg to the kick-off position in the transfer mechanism is shown at 5. A rail 6 is located at each side to maintain the kegs from falling off the conveyor chain.

As a rule in a keg palletizing device for beer kegs two transfer mechanisms will be used in order to position the bungs of such beer kegs in the proper position for the palletized load. The skids to which the kegs are to be transferred are shown at 7 and the skids lead the kegs to the palletizing station. The transfer station is indicated generally at 8 and it comprises a back stop 9 against which the kegs 10 are brought by the pick-up conveyor chain 5.

The pick-up conveyor chain 5 is designed to travel at a slightly higher speed than the conveyor 4. This is accomplished by passing the conveyor 4 over the gears 40 shown in FIGURE 2 located at one end which are smaller than the gears 41 over which the conveyor 5 passes.

When a keg has arrived at the transfer station 8 a lift 11 is moved upwardly by a plunger 12 moving in a cylinder 14 and the plunger 12 is pivotally connected by a clevis 16 to the piston rod 17 movable in the cylinder 18. The cylinder 18 is pivotally connected by a pivot 19 to the base 20 of a fixed container 21 enclosing the plunger 12 and the cylinder 18. The container 21 may be mounted upon the floor or any fixed part. The piston rod 17 is hydraulically actuated through the valve connections 22 and 23 located at the ends of the cylinder 18. When a keg is moved onto the transfer station and strikes the back stop 9 controls are actuated such as shown in the application above referred to for moving the piston rod 17 and plunger 12 upwardly so that the lift 11 will move the keg from the full line position to the dotted line position shown in FIGURE 2.

As shown in FIGURE 3 diagrammatically when a keg strikes the back plate 9 this actuates the valve marked V HYD so that hydraulic fluid under pressure will pass from the main line 42 to the conduit 23' which is connected to the valve connection 23 in order to raise the plunger 12 with the keg resting on the lift 11. As the lift moves upwardly it carries with it a control rod 43 having a roller 44 thereon. The roller 44 strikes the control roller 45 which actuates an air valve marked V AIR to direct compressed air from the air main 46 to conduit 36' which is connected to inlet port 36 of cylinder 25. This will move the piston rod 28 so as to actuate the kick-off fingers 33 to kick off the keg upon the lift 11 to the skids 7.

In this way the kick-off mechanism indicated generally at 24 is actuated in proper sequence to kick the keg 10 from the lift 11 to the skids 7.

The kick-off mechanism 24 comprises a cylinder 25 pivotally mounted upon the frame 26 by a pivot 27. The piston rod 28 has a clevis 29 secured thereto which is provided with a pivot pin 30 secured to an angularly extending rod 31 mounted fixedly upon the central kick-off finger 33. The kick-off mechanism also is provided with the kick-off fingers 33 one at each side of the central finger 33 and all of the kick-off fingers are fixed to a pivotally mounted rod 34 pivotally mounted in any desired way in the frame 26 of the machine. The cylinder 25 is provided with suitable inlet and outlet ports 35 and 36 which are connected to the main air line by conduits 35' and 36'.

The kick-off mechanism when actuated is moved from the full line position shown in FIGURE 2 to the dotted line position and this transfers the keg 10 to the skids 7 with sufficient impetus so that the kegs will roll smoothly down the skids 7 to the palletizing station without any twisting or wobbling.

The prevention of the twisting or wobbling of the kegs when travelling the skids 7 is assisted by the endless belt, not shown, but shown in the application above referred to.

In FIGURE 2 supporting standards for the conveyors are indicated at 48 and these standards cooperate with the bearings 49 which support the shafts carrying the gears 40 and 41. Power to drive conveyors 4 and 5 may be applied to gears 60.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment of the invention.

I claim:

1. A transfer mechanism for an automatic conveying and tiering mechanism for palletizing unit loads of relatively heavy articles such as barrels, kegs and the like comprising a transfer station, a conveyor for conveying articles towards said station, a pick up conveyor travelling at a slightly higher speed for taking said articles from said first conveyor to said station, means for raising each article as it arrives at said station a predetermined distance, skids leading away from said station and means for moving said article when in raised position from said station to said skids.

2. A transfer mechanism for an automatic conveying and tiering mechanism for palletizing unit loads of relatively heavy articles such as barrels, kegs and the like comprising a transfer station, a conveyor for moving articles towards said transfer station, a pick-up conveyor travelling faster than said first conveyor for taking articles from said first conveyor and moving said articles to said station, a lift located at said station for receiving said articles from second conveyor, control means at said station actuated by an article at said station for initiating the movement of said lift a predetermined distance upwardly and means for removing an article on said lift when in raised position.

3. A transfer mechanism for an automatic conveying and tiering mechanism for palletizing unit loads of relatively heavy articles such as barrels, kegs and the like comprising a transfer station, a conveyor for conveying articles to said station, means for raising each article as it arrives at said station a predetermined distance, skids leading away from said station, pivotally mounted kick-off fingers, a cylinder, a piston rod mounted in said cylinder connected to said kick-off fingers and means for actuating said piston rod to operate said kick-off fingers when an article is in raised position to thereby move said article from said station to said skids.

4. A transfer mechanism for an automatic conveying and tiering mechanism for palletizing unit loads of relatively heavy articles such as barrels, kegs and the like comprising a transfer station, means for moving an article to said station, a back stop at said station actuated by an article arriving at said station, a lift for receiving an article at said station, means operated by said back stop for moving said lift a predetermined distance upwardly, means for removing an article from said lift and means operated by said movement of said lift to actuate means for removing asid article from said lift.

5. A transfer mechanism for an automatic conveying and tiering mechanism for palletizing unit loads of relatively heavy articles such as barrels, kegs and the like comprising a transfer station, means for moving an article to said station, a back stop at said station actuated by an article arriving at said station, a lift for receiving an article at said station, means operated by said back stop for moving said lift a predetermined distance upwardly, means for removing an article from said lift, means operated by said movement of said lift to actuate means for removing said article from said lift, said last named means comprising pivotally mounted kick-off fingers pneumatically operated.

References Cited by the Examiner
UNITED STATES PATENTS

| | | | |
|---|---|---|---|
| 1,401,372 | 12/21 | Sutherland | 198—20 |
| 2,590,592 | 3/52 | Wittemann | 214—89 |
| 2,954,863 | 10/60 | Staples | 214—89 |

ERNEST A. FALLER, *Primary Examiner.*

WILLIAM B. LA BORDE, ABRAHAM BERLIN, *Examiners.*